(12) United States Patent
Xiang et al.

(10) Patent No.: US 11,131,504 B2
(45) Date of Patent: Sep. 28, 2021

(54) TEMPERATURE MONITORING SYSTEM AND METHOD FOR A SUBSTRATE HEATING FURNACE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xin Xiang, Beijing (CN); Zhiguang Guo, Beijing (CN); Benxiang Hou, Beijing (CN); Yunjie Wang, Beijing (CN); Fan Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 822 days.

(21) Appl. No.: 15/967,348

(22) Filed: Apr. 30, 2018

(65) Prior Publication Data
US 2018/0259263 A1    Sep. 13, 2018

Related U.S. Application Data

(63) Continuation-in-part of application No. PCT/CN2017/106367, filed on Oct. 16, 2017.

(30) Foreign Application Priority Data

Mar. 8, 2017  (CN) .......................... 201710134519.2

(51) Int. Cl.
*F27D 21/00* (2006.01)
*G01J 5/04* (2006.01)
(Continued)

(52) U.S. Cl.
CPC ........ *F27D 21/0014* (2013.01); *G01J 5/0044* (2013.01); *G01J 5/025* (2013.01);
(Continued)

(58) Field of Classification Search
CPC .................................................. F27D 21/0014
See application file for complete search history.

(56) References Cited

U.S. PATENT DOCUMENTS 5,830,227 A * 11/1998 Fischell .............. A61M 25/104
                                                              606/194
6,226,453 B1 * 5/2001 Yam ...................... G01J 5/0003
                                                              392/418
(Continued)

FOREIGN PATENT DOCUMENTS

CN       101542254 A      9/2009
CN       202245325 U      5/2012
(Continued)

OTHER PUBLICATIONS

First Office Action issued in Chinese Patent Application No. 201710134519.2, dated Aug. 28, 2018; with English translation.
(Continued)

*Primary Examiner* — Yara B Green
(74) *Attorney, Agent, or Firm* — McDermott Will and Emery LLP

(57) ABSTRACT

A temperature monitoring system for a substrate heating furnace includes a temperature monitor, and the temperature monitor is located on a prong of a mechanical arm which is configured to fetch and place a substrate. The temperature monitor is configured to monitor the temperature of the substrate which has been heated by the substrate heating furnace and is located on the prong.

15 Claims, 4 Drawing Sheets

(51) Int. Cl.
*G01J 5/00* (2006.01)
*G01J 5/08* (2006.01)
*G01J 5/02* (2006.01)

(52) U.S. Cl.
CPC ............... *G01J 5/041* (2013.01); *G01J 5/042* (2013.01); *G01J 5/0887* (2013.01)

(56) References Cited

U.S. PATENT DOCUMENTS

| | | | | |
|---|---|---|---|---|
| 6,816,803 | B1* | 11/2004 | Palfenier | G01J 1/4204 |
| | | | | 374/E11.003 |
| 10,184,183 | B2* | 1/2019 | Rao | G01J 5/0821 |
| 2008/0198895 | A1 | 8/2008 | Davis et al. | |
| 2014/0158675 | A1* | 6/2014 | Jing | F26B 23/06 |
| | | | | 219/392 |

FOREIGN PATENT DOCUMENTS

| | | | |
|---|---|---|---|
| CN | 102651303 A | 8/2012 |
| CN | 102784747 A | 11/2012 |
| CN | 103077909 A | 5/2013 |
| CN | 105115604 A | 12/2015 |
| CN | 205634157 U | 10/2016 |
| CN | 106206349 A | 12/2016 |
| CN | 205835425 U | 12/2016 |
| CN | 106885476 A | 6/2017 |
| JP | H07151606 A | 6/1995 |
| JP | 2001-118796 A | 4/2001 |
| JP | 2007-61854 A | 3/2007 |
| JP | 2011-108693 A | 6/2011 |

OTHER PUBLICATIONS

Zhao Jianhua, "Modem Safety Monitoring Technique," Publishing house of China Science & Technology University., 2006; pp. 135-138; with partial English translation.

Second Office Action issued in Chinese Patent Application No. 201710134519.2, dated Apr. 16, 2019; with English translation.

International Search Report and Written Opinion issued in International Application No. PCT/CN2017/106367 dated Jan. 4, 2018 (with English translation).

* cited by examiner

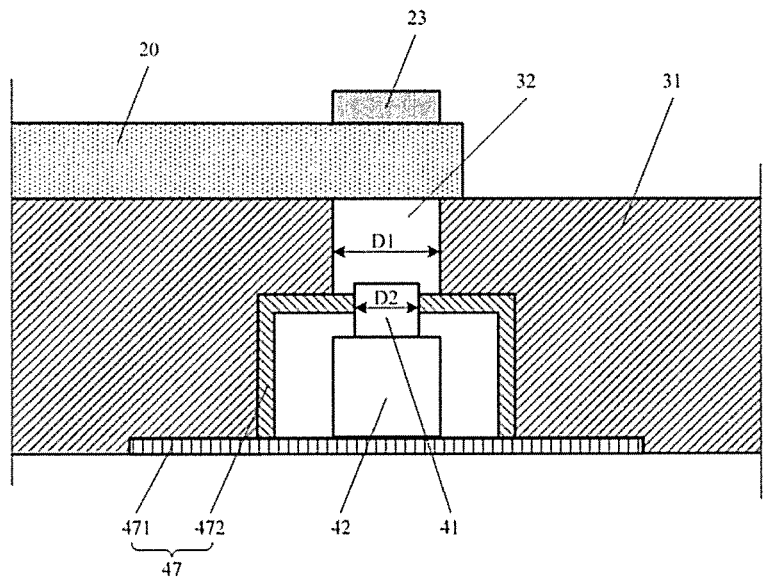
Fig. 5
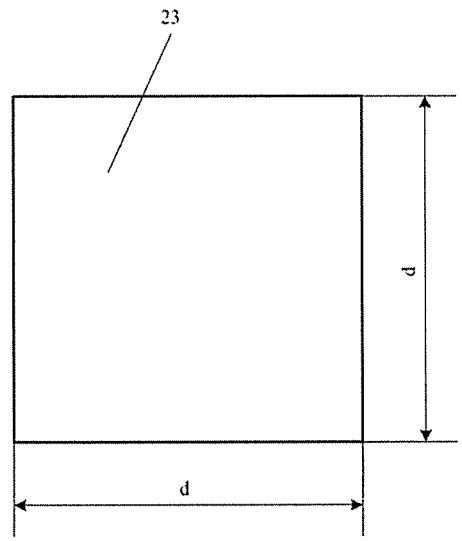
Fig. 6
S100
A temperature monitor monitors a temperature of a substrate which has been by the substrate heating furnace and is located on a prong of a mechanical arm
Fig. 7

TEMPERATURE MONITORING SYSTEM AND METHOD FOR A SUBSTRATE HEATING FURNACE

CROSS-REFERENCE TO RELATED APPLICATION

This application is a Continuation in part of International Patent Application No. PCT/CN2017/106367 filed on Oct. 16, 2017, which claims priority to Chinese Patent Application No. 201710134519.2 filed with Chinese Patent Office on Mar. 8, 2017 and titled "TEMPERATURE MONITORING SYSTEM AND METHOD FOR A SUBSTRATE HEATING FURNACE", which are incorporated herein by reference in their entirety.

TECHNICAL FIELD

The present disclosure relates to the technology field of display device manufacture, more particularly, to a temperature monitoring system and a temperature monitoring method for a substrate heating furnace.

BACKGROUND

In the technology field of display device manufacture, especially, when a substrate (e.g., an array substrate, a color film substrate and a display substrate formed by aligning an array substrate and a color film substrate, etc.) is manufactured, the substrate usually needs to be placed into a substrate heating furnace to be heated for operation of subsequent process.

SUMMARY

Embodiments of the present disclosure provide a temperature monitoring system for a substrate heating furnace, comprising a temperature monitor. The temperature monitor is located on a prong of a mechanical arm which is configured to fetch and place a substrate. The temperature monitor is configured to monitor the temperature of the substrate which has been heated by the substrate heating furnace and is located on the prong.

Further optionally, a mounting hole is provided in the prong, the mounting hole has a first opening, and the first opening is provided in a surface of the prong contacting with the substrate.

The temperature monitor comprises an infrared probe and an infrared detector, the infrared probe and the infrared detector are both arranged in the mounting hole, and the infrared probe faces towards the first opening of the mounting hole.

Optionally, a non-transparent temperature-measurement block is provided on a substrate glass dummy surrounding a display area on the substrate, and the non-transparent temperature-measurement block is located opposite the first opening of the mounting hole.

Optionally, a center line of the non-transparent temperature-measurement block, a center line of the mounting hole and a center line of the infrared probe coincide with each other.

Optionally, an orthographic projection of the non-transparent temperature-measurement block on a surface of the substrate facing towards the prong, covers an orthographic projection of the first opening of the mounting hole on the surface of the substrate facing towards the prong; and the orthographic projection of the first opening of the mounting hole on the surface of the substrate facing towards the prong, covers an orthographic projection of the infrared probe on the surface of the substrate facing towards the prong.

Optionally, the substrate is an array substrate, wherein a material of the non-transparent temperature-measurement block is the same as a material of a gate of the array substrate, or the material of the non-transparent temperature-measurement block is the same as a material of a source-and-drain layer of the array substrate, or the material of the non-transparent temperature-measurement block is the same as a material of an alignment mark of the array substrate.

Optionally, the substrate is a color film substrate, wherein the material of the non-transparent temperature-measurement block is the same as a material of a black matrix of the color film substrate, or the material of the non-transparent temperature-measurement block is the same as a material of an alignment mark of the color film substrate.

Further optionally, the temperature monitor further comprises a mounting rack, the mounting rack comprises a bottom plate and a housing provided on the bottom plate, the bottom plate is fixedly connected with the prong, and the housing has a through hole therein.

The infrared detector and the infrared probe are both fixedly arranged in a cavity formed by the bottom plate and the housing, and a front end of the infrared probe passes through the through hole and protrudes from the cavity.

Further optionally, the temperature monitor further comprises a first signal converter, a signal amplifier, an analogue-to-digital converter and a second signal converter, wherein the first signal converter is signal-connected to the infrared detector, the signal amplifier is signal-connected to the first signal converter, the analogue-to-digital converter is signal-connected to the signal amplifier, and the second signal converter is signal-connected to the analogue-to-digital converter.

The first signal converter is configured to convert an analogue current signal, which is output by the infrared detector and corresponding to the temperature of the substrate, to an analogue voltage signal.

The signal amplifier is configured to amplify the analogue voltage signal, to generate an amplified analogue voltage signal.

The analogue-to-digital converter is configured to convert the amplified analogue voltage signal to a digital voltage signal.

The second signal converter is configured to convert the digital voltage signal to a temperature signal corresponding to the temperature of the substrate.

Further optionally, the temperature monitoring system for the substrate heating furnace further comprises a controller, wherein the controller is signal-connected to the temperature monitor, and is also signal-connected to a substrate detector on the mechanical arm.

The controller is configured to, upon receiving a signal detected by the substrate detector and representing that the substrate which has been heated by the substrate heating furnace is lifted through the prong, control the temperature monitor to monitor the temperature of the substrate which has been heated by the substrate heating furnace and is located on the prong.

The controller is further configured to compare the temperature of the substrate monitored by the temperature monitor with a preset temperature range.

Optionally, the temperature monitoring system for the substrate heating furnace further comprises a display, and the display is signal-connected to the controller.

The display is configured to display the temperature of the substrate monitored by the temperature monitor.

The display is further configured to, when the temperature of the substrate monitored by the temperature monitor falls into the preset temperature range, display information which represents that the temperature is normal.

The display is further configured to, when the temperature of the substrate monitored by the temperature monitor does not fall into the preset temperature range, display information which represents that the temperature is abnormal.

Optionally, the temperature monitoring system for the substrate heating furnace further comprises an alarm. The alarm is signal-connected to the controller, and the alarm is configured to, when the temperature of the substrate monitored by the temperature monitor does not fall into the preset temperature range, send out an alarm.

Embodiments of the present disclosure further provides a temperature monitoring method for a substrate heating furnace, applied to the temperature monitoring system for the substrate heating furnace as described in the foregoing technical solutions, the temperature monitoring method for the substrate heating furnace comprises:

monitoring, by a temperature monitor, a temperature of a substrate which has been heated by the substrate heating furnace and is located on a prong of a mechanical arm.

Further optionally, the step of monitoring, by the temperature monitor, the temperature of the substrate which has been heated by the substrate heating furnace and is located on the prong of the mechanical arm, comprises:

converting, by a first signal converter of the temperature monitor, an analogue current signal, which is output by an infrared detector and corresponding to the temperature of the substrate, to an analogue voltage signal;

amplifying, by a signal amplifier of the temperature monitor, the analogue voltage signal to generate an amplified analogue voltage signal;

converting, by an analogue-to-digital converter of the temperature monitor, the amplified analogue voltage signal to a digital voltage signal; and converting, by a second signal converter of the temperature monitor, the digital voltage signal to a temperature signal corresponding to the temperature of the substrate.

Further optionally, after the step of monitoring, by the temperature monitor, the temperature of the substrate which has been heated by the substrate heating furnace and is located on the prong of the mechanical arm, the temperature monitoring method for the substrate heating furnace further comprises:

comparing, by a controller, the temperature of the substrate monitored by the temperature monitor with a preset temperature range;

displaying, by a display, the temperature of the substrate monitored by the temperature monitor; when the temperature of the substrate monitored by the temperature monitor falls into the preset temperature range, further displaying, by the display, information which represents that the temperature is normal; and when the temperature of the substrate monitored by the temperature monitor does not fall into the preset temperature range, further displaying, by the display, information which represents that the temperature is abnormal; and sending out, by an alarm, an alarm, when the temperature of the substrate monitored by the temperature monitor does not fall into the preset temperature range.

Further optionally, before the step of monitoring, by the temperature monitor, the temperature of the substrate which has been heated by the substrate heating furnace and is located on the prong of the mechanical arm, the temperature monitoring method for the substrate heating furnace further comprises:

sticking, the prong into the substrate heating furnace, and lifting, the substrate which has been heated by the substrate heating furnace in the substrate heating furnace through the prong;

sending, by a substrate detector on the mechanical arm, a signal representing that the substrate heated by the substrate heating furnace is lifted through the prong, to the controller; and controlling, by the controller, the temperature monitor to monitor the temperature of the substrate which has been heated by the substrate heating furnace and is located on the prong.

BRIEF DESCRIPTION OF THE DRAWINGS

The accompanying drawings described herein are used to provide further understanding to the disclosure and constitute a part of the disclosure. The exemplary embodiments of the disclosure and the description thereof are used to explain the disclosure, but do not constitute an improper limitation to the disclosure. In the accompanying drawings:

FIG. 5 is an enlarged view of region C in FIG. 4;

FIG. 6 is a structure diagram of a non-transparent temperature-measurement block;

FIG. 7 is a first flow chart of a temperature monitoring method for a substrate heating furnace provided by embodiments of the present disclosure.

DETAILED DESCRIPTION

Figure 1:
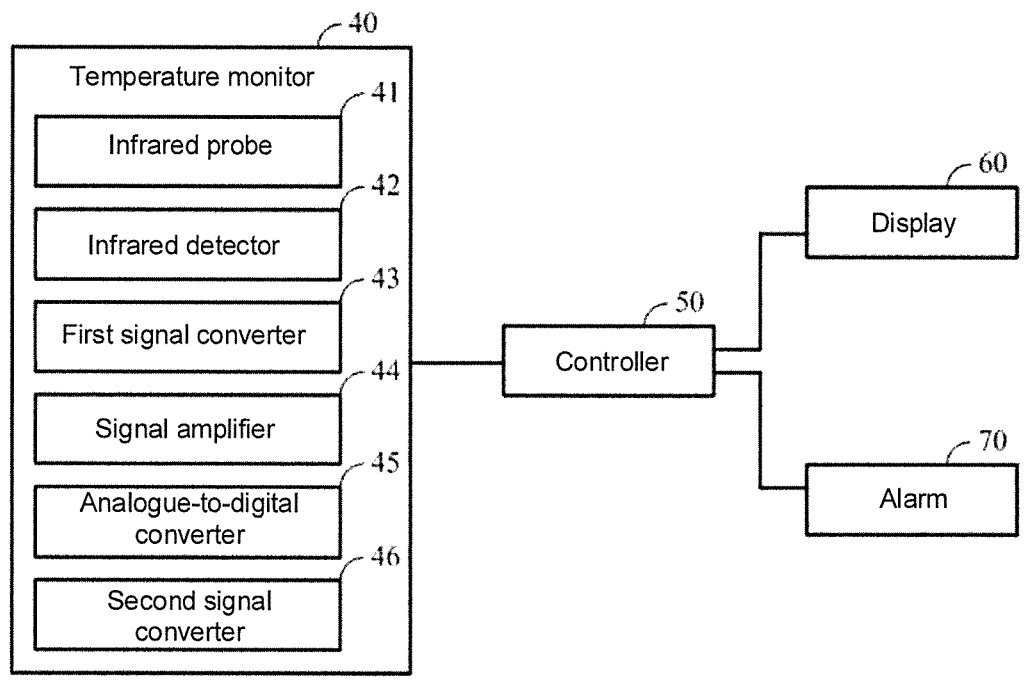
FIG. 1 is a structure diagram of a temperature monitoring system for a substrate heating furnace provided by embodiments of the present disclosure.
Figure 2:
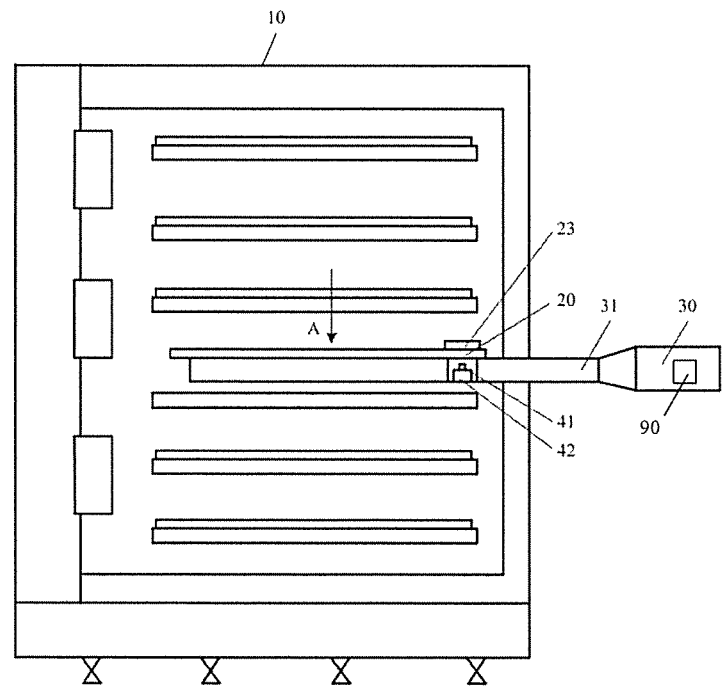
FIG. 2 is a diagram of a substrate in the substrate heating furnace being lifted by a prong according to embodiments of the present disclosure.

In order to further describe a temperature monitoring system and a temperature monitoring method for a substrate heating furnace provided by embodiments of the disclosure, they will be described below in detail with reference to the accompanying drawings.

At present, it is typically to select a temperature monitoring region in a substrate heating furnace, and arrange a temperature monitor (such as a thermocouple) in the temperature monitoring region, to monitor the temperature in the substrate heating furnace and the temperature of the substrate, by taking the temperature monitored by the temperature monitor as the temperature in the substrate heating furnace and the temperature of the substrate.

However, when the temperature in the substrate heating furnace is monitored in the foregoing manner, the temperature monitored by the temperature monitor is actually the temperature of the temperature monitoring region. That is, the temperature monitored by the temperature monitor is the temperature of a local region in the substrate heating furnace. And the actual temperature of the substrate is different from the temperature monitored by the temperature monitor. So taking the temperature monitored by the temperature monitor as the temperature of the substrate will result in inaccurate monitoring for the temperature of the substrate.

In order to solve the technical problem of inaccurate monitoring for the temperature of the substrate, please refer to FIG. 1 to FIG. 5. A temperature monitoring system for a substrate heating furnace provided by embodiments of the present disclosure includes a temperature monitor 40. The temperature monitor 40 is located on a prong 31 of a mechanical arm 30 which is configured to fetch and place a substrate 20. The temperature monitor 40 is configured to monitor the temperature of the substrate 20 which has been heated by a substrate heating furnace 10 and is located on the prong 31.

When implemented specifically, substrate 20 is able to be an array substrate, a color film substrate, a glass substrate, a display substrate formed by aligning an array substrate and a color film substrate, etc. Please refer to FIG. 2. Substrate 20 is located in the substrate heating furnace 10 for heating. After the substrate heating furnace 10 finishes heating the substrate 20, the prong 31 of the mechanical arm 30 is stuck into the substrate heating furnace 10, and the substrate 20 located in the substrate heating furnace 10 is lifted through the prong 31. At this time, temperature monitor 40 is able to start to directly monitor the temperature of the substrate 20 located on the prong 31.

It can be seen from the foregoing that, when the temperature monitoring system for the substrate heating furnace provided by embodiments of the present disclosure is applied, after the substrate heating furnace 10 finishes heating the substrate 20 located in the substrate heating furnace 10, the prong 31 of the mechanical arm 30 which is configured to fetch and place the substrate 20 is stuck into the substrate heating furnace 10, and the substrate 20 located in the substrate heating furnace 10 is lifted through the prong 31. The temperature monitor 40 located on the prong 31 monitors the temperature of the substrate 20 which is located on the prong 31 and heated by the substrate heating furnace 10. So that, in the temperature monitoring system for the substrate heating furnace provided by embodiments of the present disclosure, the temperate of the substrate 20 located on the prong 31 is monitored by the temperature monitor 40 located on the prong 31 of the mechanical arm 30 which is configured to fetch and place the substrate 20. That is, in the temperature monitoring system for the substrate heating furnace provided by embodiments of the present disclosure, the temperature monitor 40 directly monitors the temperature of the substrate 20, to obtain the temperature of the substrate 20 which has been heated by the substrate heating furnace 10. Compared with taking the temperature of a local region in the substrate heating furnace 10 as the temperature of the substrate 20 in the prior art, the temperature of the substrate 20 obtained is more accurate, so that the accuracy of monitoring the temperature of the substrate 20 is improved.

In addition, in the temperature monitoring system for the substrate heating furnace provided by embodiments of the present disclosure, it is also able to reflect the temperature in the substrate heating furnace 10 by monitoring the temperature of the substrate 20 more accurately, to achieve monitoring the temperature of the substrate heating furnace 10, so that the deterioration, caused by an abnormality of the temperature in the substrate heating furnace 10, of quality of the substrate 20 is prevented.

It is worth mentioning that, in one embodiment, there is one temperature monitor 40, and the temperature monitor 40 is disposed on one of prongs 31 of a mechanical arm 30. For example, as shown in FIG. 2 to FIG. 5, the temperature monitor 40 is able to be disposed on the lowest prong 31 in FIG. 3. In another embodiment, there are a plurality of temperature monitors 40. The plurality of temperature monitors 40 are able to be arranged on a same prong 31 of a mechanical arm 30 or arranged respectively on different prongs 31 of the mechanical arm 30; or some of the temperature monitor 40 is able to be arranged on one of the prongs 31 of the mechanical arm 30, while the other temperature monitors are arranged on the other prongs 31 of the mechanical arm 30 respectively.

In the foregoing embodiments, a temperature monitor 40 is disposed on a prong 31, and the temperature monitor 40 is able to be disposed on the prong 31 in a variety of ways. For example, the temperature monitor 40 is able to be attached to a surface, contacting with the substrate 20 located on the prong 31, of the prong 31; or the temperature monitor 40 is disposed in a groove which is provided in the surface of the prong 31 contacting with the substrate 20. In embodiments of the present disclosure, please continue to refer to FIG. 4 and FIG. 5. A mounting hole 32 is provided in the prong 31, the mounting hole 32 has a first opening, and the first opening is provided in the surface of the prong 31 contacting with the substrate 20. The temperature monitor 40 is mounted in the mounting hole 32. Specifically, please refer to FIG. 4 and FIG. 5. When the substrate 20 is lifted through the prong 31, the upper surface of the prong 31 contacts with the substrate 20 located on the prong 31. The mounting hole 32 is provided in the prong 31. And the mounting hole 32 has the first opening provided in the upper surface of the prong 31.

In the foregoing embodiments, the temperature monitor 40 is able to be in a plurality of types. For example, the temperature monitor 40 is able to be a thermocouple, a thermal resistance, etc. In embodiments of the present disclosure, please continue to refer to FIG. 1, FIG. 4 and FIG. 5. The temperature monitor 40 includes an infrared probe 41 and an infrared detector 42. The infrared probe 41 and the infrared detector 42 are both arranged in the mounting hole 32. The infrared probe 41 faces towards the first opening of the mounting hole 32 and does not protrude from the mounting hole 32. That is, a front end of the infrared probe 41 is flush with the upper surface of the prong 31 in FIG. 5, or the front end of the infrared probe 41 is lower than the upper surface of the prong 31 in FIG. 5. When the temperature monitor 40 monitors the temperature of the substrate 20 located on the prong 31, the infrared probe 41 converges the infrared light, radiated from the substrate 20, to the infrared detector 42, and the infrared detector 42 converts the infrared light to a signal corresponding to the temperature of the substrate 20, so that monitoring the temperature of the substrate 20 is achieved. Therefore, in embodiments of the present disclosure, the temperature monitor 40 monitors the infrared light radiated from substrate 20 to achieve monitoring the temperature of the substrate 20, and the temperature monitor 40 does not need to contact with the substrate 20, so that the damage of the substrate 20 caused by the contact between the temperature monitor 40 and the substrate 20 can be prevented. And, when the temperature monitor 40 detects the infrared light radiated from the substrate 20 to monitor the temperature of the substrate 20, the accuracy is relatively high, so that the accuracy of monitoring the temperature of the substrate 20 can be further improved.

Figure 3:
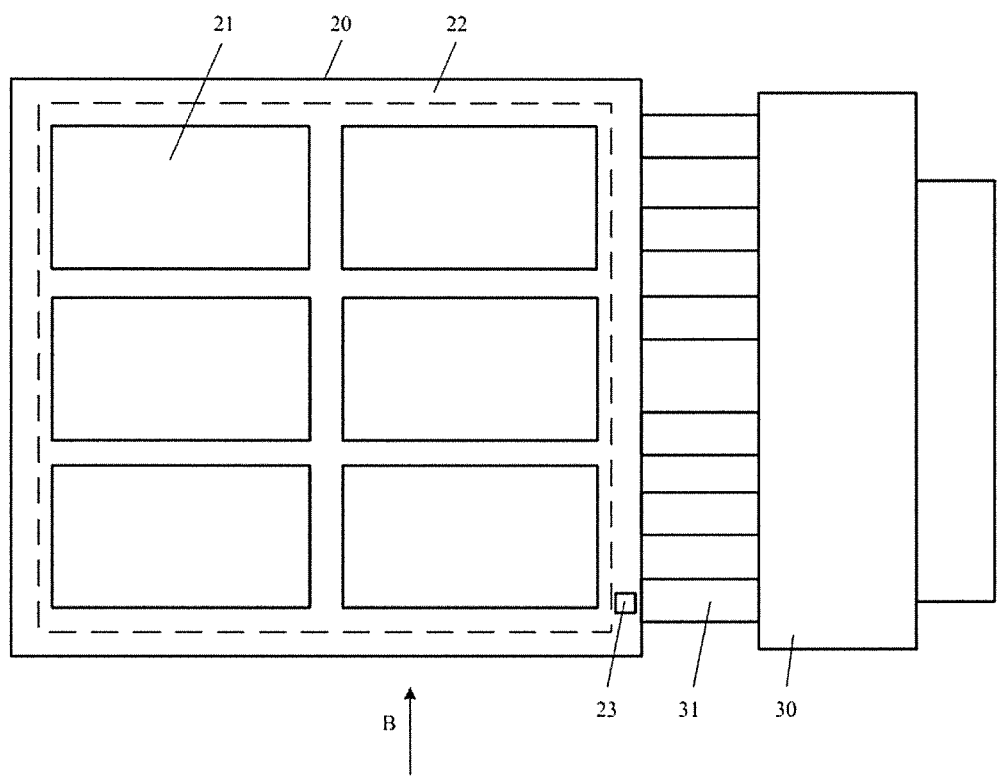
FIG. 3 is a view from direction A in FIG. 2.
Figure 4:
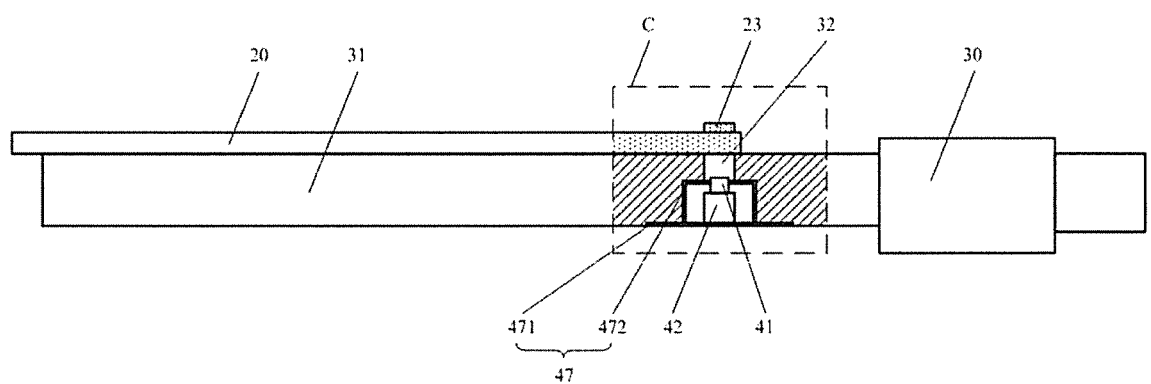
FIG. 4 is a view from direction B in FIG. 3.

In order to further improve the accuracy of monitoring the temperature of the substrate 20, please continue to refer to FIG. 3 to FIG. 5. A non-transparent temperature-measurement block 23 is provided on a substrate glass dummy 22 surrounding a display area 21 on the substrate 20, and the non-transparent temperature-measurement block 23 is located opposite the first opening of the mounting hole 32. For example, please continue to refer to FIG. 3. The substrate 20 is able to be a motherboard comprising a plurality of display areas 21, a marginal area of the substrate 20 includes the substrate glass dummy 22, and the substrate glass dummy 22 is provided thereon with the non-transparent temperature-measurement block 23 which is located opposite the first opening of the mounting hole 32 in the prong 31. When the temperature monitoring system for the substrate heating furnace 10 provided by embodiments of the present disclosure is used, the infrared probe 41 converges the infrared light radiated from the non-transparent temperature-measurement block 23 to the infrared detector 42, and the infrared detector 42 converts the infrared light to a signal corresponding to the temperature of the substrate 20, to achieve monitoring the temperature of the substrate 20. Due to the arrangement of the non-transparent temperature-measurement block 23, more infrared light is converged to the infrared detector 42 by the infrared probe 41, to improve the accuracy of the temperature monitor 40 in monitoring the temperature of the substrate 20. Accordingly, the accuracy of monitoring the temperature of the substrate 20 is further improved.

In actual use, the location of the non-transparent temperature-measurement block 23 is able to be set according to actual needs. For example, the substrate 20 is the motherboard comprising a plurality of display areas 21, and the non-transparent temperature-measurement block 23 is able to be disposed in a blank area between two adjacent display areas 21.

In the foregoing embodiments, a location relationship of the non-transparent temperature-measurement block 23, the mounting hole 32 and the infrared probe 41 is able to meet that a center line of the non-transparent temperature-measurement block 23, a center line of the mounting hole 32 and a center line of the infrared probe 41 coincide with each other. With such design, the infrared probe 41 can be facilitated converging the infrared light radiated from non-transparent temperature-measurement block 23 to the infrared detector 42, to improve the accuracy of the temperature monitor 40 in monitoring the temperature of the substrate 20. Accordingly, the accuracy of monitoring the temperature of the substrate 20 is further improved.

In the foregoing embodiments, a structure of the non-transparent temperature-measurement block 23 can be set according to actual needs. For example, the non-transparent temperature-measurement block 23 is able to be in a square column structure, and at this time, referring to FIG. 6 please, an orthographic projection, on the lower surface of the substrate 20 in FIG. 5, of the non-transparent temperature-measurement block 23 is able to be a square. Or the non-transparent temperature-measurement block 23 is able to be in a triangular prism structure, and at this time, the orthographic projection, on the lower surface of the substrate 20 in FIG. 5, of the non-transparent temperature-measurement block 23 is a triangle. Or the non-transparent temperature-measurement block 23 is able to be in a cylinder structure, and at this time, the orthographic projection, on the lower surface of the substrate 20 in FIG. 5, of the non-transparent temperature-measurement block 23 is a circle.

In embodiments of the present disclosure, a shape relationship of the non-transparent temperature-measurement block 23, the mounting hole 32 and the infrared probe 41 is able to meet that the orthographic projection of the non-transparent temperature-measurement block 23 on the surface of the substrate 20 facing towards the prong 31 covers an orthographic projection of the first opening of the mounting hole 32 on the surface of the substrate 20 facing towards the prong 31, and the orthographic projection of the first opening of the mounting hole 32 on the surface of the substrate 20 facing towards the prong 31 covers an orthographic projection of the infrared probe 41 on the surface of the substrate 20 facing towards the prong 31. For example, the non-transparent temperature-measurement block 23 is in the square column structure. Please refer to FIG. 6. The orthographic projection, on the lower surface of the substrate 20 in FIG. 5, of the non-transparent temperature-measurement block 23 is able to be a square, and the width of the non-transparent temperature-measurement block 23 is d. Please refer to FIG. 5. The mounting hole 32 is a cylindrical hole, and the diameter of the first opening of the mounting hole 32 is D1. The infrared probe 41 is cylindrical, and the diameter of the infrared probe 41 is D2. Accordingly, the width d, the diameter D1 and the diameter D2 need to meet d≥D1≥D2. With such design, the infrared probe 41 can be facilitated converging the infrared light radiated from non-transparent temperature-measurement block 23 to the infrared detector 42, to improve the accuracy of the temperature monitor 40 in monitoring the temperature of the substrate 20. Accordingly, the accuracy of monitoring the temperature of the substrate 20 is further improved.

In the foregoing embodiments, a material of the non-transparent temperature-measurement block 23 is able to be set according to actual needs. For example, when the substrate 20 is an array substrate, the material of the non-transparent temperature-measurement block 23 is able to be the same as that of a gate of the array substrate, and at this time, the non-transparent temperature-measurement block 23 is able to be formed simultaneously with the gate of the array substrate. Or the material of the non-transparent temperature-measurement block 23 is able to be the same as that of a source—and -drain layer of the array substrate, and at this time, the non-transparent temperature-measurement block 23 is able to be formed simultaneously with the source—and -drain layer of the array substrate. Or the material of the non-transparent temperature-measurement block 23 is able to be the same as that of an alignment mark of the array substrate, and at this time, the non-transparent temperature-measurement block 23 is able to be formed simultaneously with the alignment mark of the array substrate. With such design, the process steps for the array substrate can be reduced, time is saved, and cost is reduced.

When the substrate 20 is a color film substrate, the material of the non-transparent temperature-measurement block 23 is able to be the same as that of a black matrix of the color film substrate, and at this time, the non-transparent temperature-measurement block 23 is able to be formed simultaneously with the black matrix of the color film substrate. Or the material of the non-transparent temperature-measurement block 23 is able to be the same as that of an alignment mark of the color film substrate, and at this time, the non-transparent temperature-measurement block 23 is able to be formed simultaneously with the alignment mark of the color film substrate. With such design, the process steps for the color film substrate can be reduced, time is saved, and cost is reduced.

When the substrate 20 is a display substrate formed by aligning an array substrate and a color film substrate, the non-transparent temperature-measurement block 23 can adopt a non-transparent temperature-measurement block 23 formed in the production of the array substrate or the color film substrate.

In the foregoing embodiments, the infrared detector 42 and the infrared probe 41 are both arranged in the mounting hole 32, and there are able to be a variety of arrangement ways for the infrared detector 42 and the infrared probe 41. For example, the mounting hole 32 is able to be a blind hole, and both the infrared detector 42 and the infrared probe 41 are arranged in the bottom of the mounting hole 32. Or the mounting hole 32 is a through hole or a blind hole, and both the infrared detector 42 and the infrared probe 41 are arranged on the wall of the mounting hole 32. In embodiments of the present disclosure, please continue to refer to FIG. 5. The temperature monitor 40 further comprises a mounting rack 47. The mounting rack 47 comprises a bottom plate 471 and a housing 472 provided on the bottom plate 471, the bottom plate 471 is fixedly connected with the prong 31, and the housing 472 has a through hole therein. The infrared detector 42 and the infrared probe 41 are both fixedly arranged in a cavity formed by the bottom plate 471 and the housing 472. The front end of the infrared probe 41 passes through the through hole and protrudes from the cavity. The infrared probe 41 is fixedly connected with the housing 472. For example, please continue to refer to FIG. 5. The mounting hole 32 in the prong 31 is a through hole. The upper surface of the bottom plate 471 of the mounting rack 47 is fitted on the lower surface of the prong 31. The housing 472 of the mounting rack 47 is on the bottom plate 471. The housing 472 is located in the mounting hole 32. A through hole is provided in a top plate, opposite the bottom plate 471, of the housing 472. The infrared detector 42 and the infrared probe 41 are both fixedly arranged in the cavity between the bottom plate 471 and the housing 472. The front end of the infrared probe 41 passes through the through hole and protrudes from the cavity. The infrared probe 41 is fixedly connected with the wall of the through hole. With such design, the stability of arranging the infrared detector 42 and the infrared probe 41 in the mounting hole 32 is strengthened, to avoid the infrared probe 41 shaking during the movement of the mechanical arm 30, so that the accuracy of the temperature monitor 40 in monitoring the temperature of the substrate 20 is improved.

Please continue to refer to FIG. 1. In embodiments of the present disclosure, the temperature monitor 40 further comprises a first signal converter 43, a signal amplifier 44, an analogue-to-digital converter 45 and a second signal converter 46. The first signal converter 43 is signal-connected to the infrared detector 42. The signal amplifier 44 is signal-connected to the first signal converter 43. The analogue-to-digital converter 45 is signal-connected to the signal amplifier 44. The second signal converter 46 is signal-connected to the analogue-to-digital converter 45. The first signal converter 43 is configured to convert an analogue current signal, which is output by the infrared detector 42 and corresponding to the temperature of the substrate 20, to an analogue voltage signal. The signal amplifier 44 is configured to amplify the analogue voltage signal, to generate an amplified analogue voltage signal. The analogue-to-digital converter 45 is configured to convert the amplified analogue voltage signal to a digital voltage signal. The second signal converter 46 is configured to convert the digital voltage signal to a temperature signal corresponding to the temperature of the substrate 20.

According to some embodiments, the first signal converter 43 is a current converter. According to some embodiments, the first signal converter 43 is a current-to-voltage conversion circuit. According to some embodiments, the signal amplifier 44 is an amplifying circuit. According to some embodiments, the second signal converter 46 is a digital signal processor.

During specific implementation, the infrared probe 41 converges the infrared light, radiated from the non-transparent temperature-measurement block 23, to the infrared detector 42. According to the infrared light, the infrared detector 42 generates the analogue current signal corresponding to the temperature of the substrate 20. The first signal converter 43 converts the analogue current signal, output by the infrared detector 42, to the analogue voltage signal. According to a preset amplification factor, the signal amplifier 44 amplifies the analogue voltage signal, generating the amplified analogue voltage signal. The analogue-to-digital converter 45 converts the amplified analogue voltage signal to the digital voltage signal. The second signal converter 46 is configured to convert the digital voltage signal to the temperature signal corresponding to the temperature of the substrate 20, to achieve monitoring the temperature of the substrate 20.

It is worth mentioning that the first signal converter 43, the signal amplifier 44, the analogue-to-digital converter 45 and the second signal converter 46 are able to be all arranged in the cavity formed by the bottom plate 471 and the housing 472 of the mounting rack 47. Or the first signal converter 43, the signal amplifier 44, the analogue-to-digital converter 45 and the second signal converter 46 are able to be all arranged in a position other than the mechanical arm 30, and at this time, the first signal converter 43 is able to be signal-connected with the infrared detector 42 through a data line.

Please continue to refer to FIG. 1. In embodiments of the present disclosure, the temperature monitoring system for the substrate heating furnace further comprises a controller 50. The controller 50 is signal-connected to the temperature monitor 40, and is also signal-connected to a substrate detector 90 on the mechanical arm 30. The controller 50 is configured to, upon receiving a signal detected by the substrate detector 90 and representing that the substrate 20 which has been heated by the substrate heating furnace 10 is lifted through the prong 31, control the temperature monitor 40 to monitor the temperature of the substrate 20 which has been heated by the substrate heating furnace 10 and is located on the prong 31. The controller 50 is further configured to compare the temperature of the substrate 20 monitored by the temperature monitor 40 with a preset temperature range, to determine whether the temperature of the substrate 20 is in the preset temperature range. That is, the controller 50 determines whether the temperature of the substrate 20 is abnormal. And the controller 50 is also able to determine whether the temperature in the substrate heating furnace 10 is abnormal.

According to some embodiments, the controller 50 is a microprocessor which is programmed to implement one or more operations and/or functions described herein. According to some embodiments, the entirety or a part of the controller 50 is implemented by hardware which is specifically configured, such as by one or more application specific integrated circuits (i.e., ASIC(s)).

It is worth mentioning that after the substrate heating furnace 10 finishes heating the substrate 20, the prong 31 of the mechanical arm 30 is stuck into the substrate heating furnace 10, and the substrate 20 in the substrate heating furnace 10 is lifted through the prong 31 of the mechanical arm 30. At this time, the substrate detector 90 on the mechanical arm 30 detects that the substrate 20 is lifted trough the prong 31. Then the substrate detector 90 sends the signal that the substrate 20 is lifted through the prong 31 to the controller 50. After receiving the signal that the substrate 20 is lifted through the prong 31, the controller 50 controls the temperature monitor 40 to monitor the temperature of the substrate 20. That is, the temperature monitor 40 monitors the temperature of the substrate 20 after the substrate 20 is lifted through the prong 31, and the substrate 20 is not taken out from the substrate heating furnace 10.

In actual use, the temperature monitor 40 is also able to monitor the temperature of the substrate 20 after the substrate 20 is taken out from the substrate heating furnace 10. At this time, the substrate detector 90 detects that the substrate 20 is taken out from the substrate heating furnace 10, then the substrate detector 90 sends a signal that the substrate 20 is taken out from the substrate heating furnace 10 to the controller 50. The controller 50 receives the signal that the substrate 20 is taken out from the substrate heating furnace 10, then controls the temperature monitor 40 to monitor the temperature of the substrate 20. The temperature monitor 40 monitors the temperature of the substrate 20 after the substrate 20 is taken out from the substrate heating furnace 10, so it is able to prevent other substrates 20 in the substrate heating furnace 10 and the substrate heating furnace 10 from affecting the temperature of the substrate 20 monitored by the temperature monitor 40. So that the accuracy of monitoring the temperature of the substrate 20 is further improved.

Please continue to refer to FIG. 1. The temperature monitoring system for the substrate heating furnace provided by embodiments of the present disclosure further comprises a display 60. The display 60 is signal-connected to the controller 50. The display 60 is configured to display the temperature of the substrate 20 monitored by the temperature monitor 40. The display 60 is further configured to, when the temperature of the substrate 20 monitored by the temperature monitor 40 falls into the preset temperature range, display information which represents that the temperature is normal. The display 60 is further configured to, when the temperature of the substrate 20 monitored by the temperature monitor 40 does not fall into the preset temperature range, display information which represents that the temperature is abnormal. The display 60 is configured to display the temperature of the substrate 20 monitored by the temperature monitor 40 and whether the temperature of the substrate 20 is normal, to facilitate a worker adjusting the substrate heating furnace 10 in time.

Please continue to refer to FIG. 1. The temperature monitoring system for the substrate heating furnace provided by embodiments of the present disclosure further comprises an alarm 70. The alarm 70 is signal-connected to the controller 50. The alarm 70 is configured to, when the temperature of the substrate 20 monitored by the temperature monitor 40 does not fall into the preset temperature range, send out an alarm. The alarm 70 is able to a buzzer alarm. When the temperature of the substrate 20 monitored by the temperature monitor 40 does not fall into the preset temperature range, that is, the temperature of the substrate 20 is abnormal, the temperature of the substrate heating furnace 10 is also possibly abnormal, then the alarm 70 sends out an alarm, to remind a worker that the temperature of the substrate 20 is abnormal, so that the worker is facilitated adjusting the substrate heating furnace 10 in time.

Please refer to FIG. 7. Embodiments of the present disclosure provide a temperature monitoring method for a substrate heating furnace applied to a temperature monitoring system for a substrate heating furnace as described in the foregoing embodiments. The temperature monitoring method for the substrate heating furnace comprises:

Step S100: A temperature monitor monitors a temperature of a substrate which has been by the substrate heating furnace and is located on a prong of a mechanical arm.

Compared with the prior art, the advantage of the temperature monitoring method for the substrate heating furnace is the same as that of the temperature monitoring system for the substrate heating furnace, it will not be elaborated herein.

Figure 8:
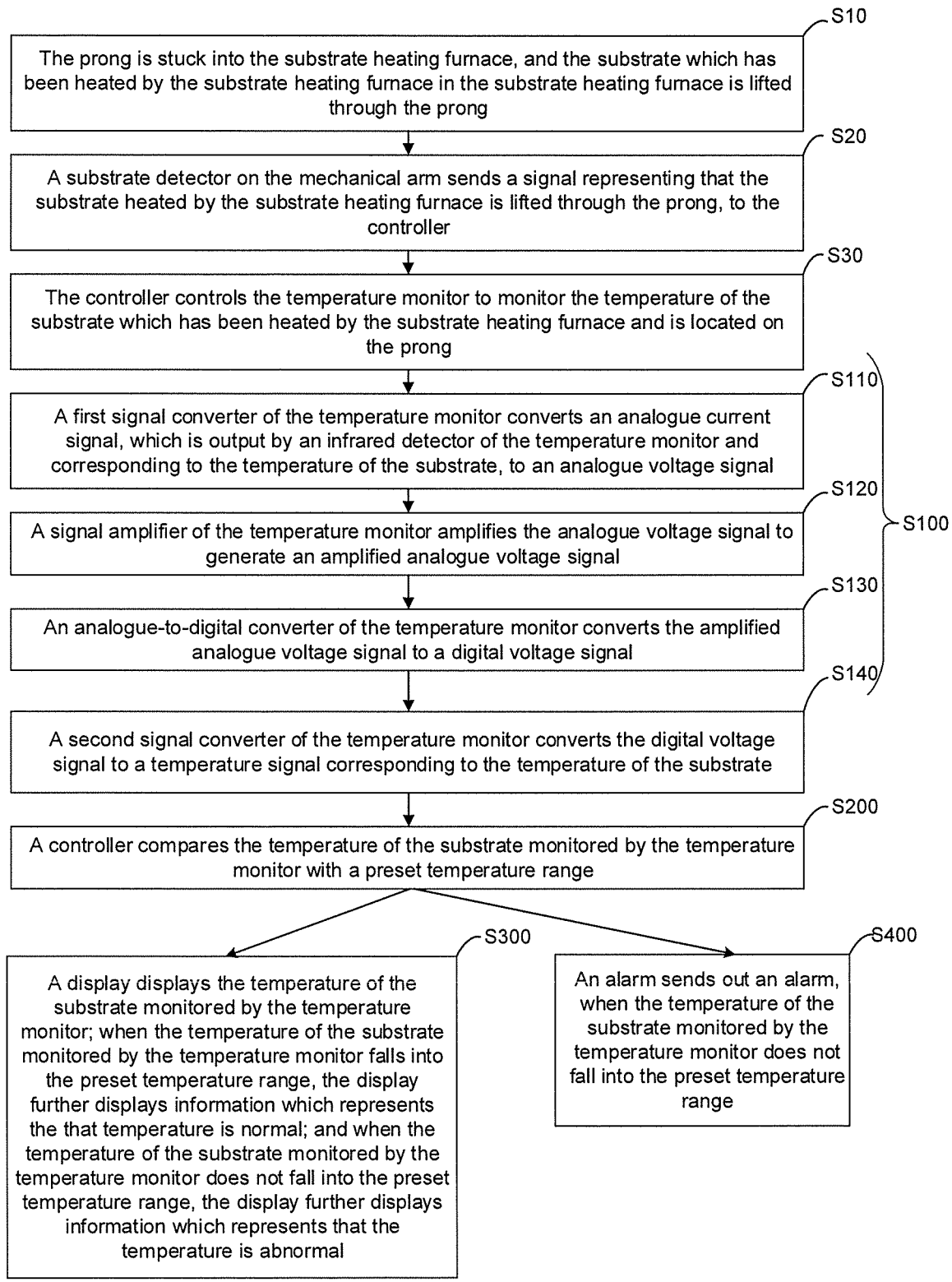
FIG. 8 is a second flow chart of a temperature monitoring method for the substrate heating furnace provided by embodiments of the present disclosure.

Please refer to FIG. 8. In step 100, the step of that the temperature monitor monitors the temperature of the substrate which has been heated by the substrate heating furnace and is located on the prong of the mechanical arm, is able to comprise:

Step S110: A first signal converter of the temperature monitor converts an analogue current signal, which is output by an infrared detector of the temperature monitor and corresponding to the temperature of the substrate, to an analogue voltage signal.

Step S120: A signal amplifier of the temperature monitor amplifies the analogue voltage signal to generate an amplified analogue voltage signal.

Step S130: An analogue-to-digital converter of the temperature monitor converts the amplified analogue voltage signal to a digital voltage signal.

Step S140: A second signal converter of the temperature monitor converts the digital voltage signal to a temperature signal corresponding to the temperature of the substrate.

Please continue to refer to FIG. 7 and FIG. 8. After step S100, that the temperature monitor monitors the temperature of the substrate which has been heated by the substrate heating furnace and is located on the prong of the mechanical arm, the temperature monitoring method for the substrate heating furnace further comprises:

Step S200: A controller compares the temperature of the substrate monitored by the temperature monitor with a preset temperature range.

Step S300: A display displays the temperature of the substrate monitored by the temperature monitor; when the temperature of the substrate monitored by the temperature monitor falls into the preset temperature range, the display further displays information which represents the that temperature is normal; and when the temperature of the substrate monitored by the temperature monitor does not fall into the preset temperature range, the display further displays information which represents that the temperature is abnormal.

Step S400: An alarm sends out an alarm, when the temperature of the substrate monitored by the temperature monitor does not fall into the preset temperature range.

Please continue to refer to FIG. 7 and FIG. 8. Before step S100, that the temperature monitor monitors the temperature of the substrate which has been heated by the substrate heating furnace and is located on the prong of the mechanical arm, the temperature monitoring method for the substrate heating furnace further comprises:

Step S10: The prong is stuck into the substrate heating furnace, and the substrate which has been heated by the substrate heating furnace in the substrate heating furnace is lifted through the prong.

Step S20: A substrate detector on the mechanical arm sends a signal representing that the substrate heated by the substrate heating furnace is lifted through the prong, to the controller.

Step S30: The controller controls the temperature monitor to monitor the temperature of the substrate which has been heated by the substrate heating furnace and is located on the prong.

In the description of the foregoing embodiments, specific features, structures, materials or characteristics are able to be combined in any one or more embodiments or examples in a suitable manner.

The foregoing merely shows specific implementations of the present disclosure, but the protection scope of the present disclosure is not limited thereto. In the technical scope of the present disclosure, variations or replacements which can be easily conceived by those skilled in the art, shall fall into the protection scope of the present disclosure. Therefore, the protection scope of the present disclosure should be subject to the protection scope of the claims.

What is claimed is:

1. A temperature monitoring system for a substrate heating furnace, comprising a temperature monitor, wherein the temperature monitor is located on a prong of a mechanical arm which is configured to fetch and place a substrate, and the temperature monitor is configured to monitor a temperature of the substrate which has been heated by the substrate heating furnace and is located on the prong.

2. The temperature monitoring system for the substrate heating furnace according to claim 1, wherein a mounting hole is provided in the prong, the mounting hole has a first opening, and the first opening is provided in a surface of the prong contacting with the substrate; and the temperature monitor comprises an infrared probe and an infrared detector, the infrared probe and the infrared detector are both arranged in the mounting hole, and the infrared probe faces towards the first opening of the mounting hole.

3. The temperature monitoring system for the substrate heating furnace according to claim 2, wherein a non-transparent temperature-measurement block is provided on a substrate glass dummy surrounding a display area on the substrate, and the non-transparent temperature-measurement block is located opposite the first opening of the mounting hole.

4. The temperature monitoring system for the substrate heating furnace according to claim 3, wherein a center line of the non-transparent temperature-measurement block, a center line of the mounting hole and a center line of the infrared probe coincide with each other.

5. The temperature monitoring system for the substrate heating furnace according to claim 3, wherein an orthographic projection of the non-transparent temperature-measurement block on a surface of the substrate facing towards the prong, covers an orthographic projection of the first opening of the mounting hole on the surface of the substrate facing towards the prong; and the orthographic projection of the first opening of the mounting hole on the surface of the substrate facing towards the prong, covers an orthographic projection of the infrared probe on the surface of the substrate facing towards the prong.

6. The temperature monitoring system for the substrate heating furnace according to claim 3, wherein the substrate is an array substrate, a material of the non-transparent temperature-measurement block is the same as a material of a gate of the array substrate, or the material of the non-transparent temperature-measurement block is the same as a material of a source-and-drain layer of the array substrate, or the material of the non-transparent temperature-measurement block is the same as a material of an alignment mark of the array substrate; or the substrate is a color film substrate, wherein the material of the non-transparent temperature-measurement block is the same as a material of a black matrix of the color film substrate, or the material of the non-transparent temperature-measurement block is the same as a material of an alignment mark of the color film substrate.

7. The temperature monitoring system for the substrate heating furnace according to claim 2, wherein the temperature monitor further comprises a mounting rack, the mounting rack comprises a bottom plate and a housing provided on the bottom plate, the bottom plate is fixedly connected with the prong, and the housing has a through hole therein; and the infrared detector and the infrared probe are both fixedly arranged in a cavity formed by the bottom plate and the housing, and a front end of the infrared probe passes through the through hole and protrudes from the cavity.

8. The temperature monitoring system for the substrate heating furnace according to claim 2, wherein the temperature monitor further comprises a first signal converter, a signal amplifier, an analogue-to-digital converter and a second signal converter, wherein the first signal converter is signal-connected to the infrared detector, the signal amplifier is signal-connected to the first signal converter, the analogue-to-digital converter is signal-connected to the signal amplifier, and the second signal converter is signal-connected to the analogue-to-digital converter;

the first signal converter is configured to convert an analogue current signal, which is output by the infrared detector and corresponding to the temperature of the substrate, to an analogue voltage signal;

the signal amplifier is configured to amplify the analogue voltage signal, to generate an amplified analogue voltage signal;

the analogue-to-digital converter is configured to convert the amplified analogue voltage signal to a digital voltage signal; and the second signal converter is configured to convert the digital voltage signal to a temperature signal corresponding to the temperature of the substrate.

9. The temperature monitoring system for the substrate heating furnace according to claim 1, wherein the temperature monitoring system for the substrate heating furnace further comprises a controller, wherein the controller is signal-connected to the temperature monitor, and is also signal-connected to a substrate detector on the mechanical arm;

the controller is configured to, upon receiving a signal detected by the substrate detector and representing that the substrate which has been heated by the substrate heating furnace is lifted through the prong, control the temperature monitor to monitor the temperature of the substrate which has been heated by the substrate heating furnace and is located on the prong; and the controller is further configured to compare the temperature of the substrate monitored by the temperature monitor with a preset temperature range.

10. The temperature monitoring system for the substrate heating furnace according to claim 9, wherein the temperature monitoring system for the substrate heating furnace further comprises a display, and the display is signal-connected to the controller;

the display is configured to display the temperature of the substrate monitored by the temperature monitor;

the display is further configured to, when the temperature of the substrate monitored by the temperature monitor falls into the preset temperature range, display information which represents that the temperature is normal; and the display is further configured to, when the temperature of the substrate monitored by the temperature monitor does not fall into the preset temperature range, display information which represents that the temperature is abnormal.

11. The temperature monitoring system for the substrate heating furnace according to claim 9, wherein the temperature monitoring system for the substrate heating furnace further comprises an alarm, the alarm is signal-connected to the controller, and the alarm is configured to, when the temperature of the substrate monitored by the temperature monitor does not fall into the preset temperature range, send out an alarm.

12. A temperature monitoring method for a substrate heating furnace, applied to the temperature monitoring system for the substrate heating furnace according to claim 1, wherein the temperature monitoring method for the substrate heating furnace comprises:

monitoring, by a temperature monitor, a temperature of a substrate which has been heated by the substrate heating furnace and is located on a prong of a mechanical arm.

13. The temperature monitoring method for the substrate heating furnace according to claim 12, wherein, the step of monitoring, by the temperature monitor, the temperature of the substrate which has been heated by the substrate heating furnace and is located on the prong of the mechanical arm, comprises:

converting, by a first signal converter of the temperature monitor, an analogue current signal, which is output by an infrared detector and corresponding to the temperature of the substrate, to an analogue voltage signal;

amplifying, by a signal amplifier of the temperature monitor, the analogue voltage signal to generate an amplified analogue voltage signal;

converting, by an analogue-to-digital converter of the temperature monitor, the amplified analogue voltage signal to a digital voltage signal; and converting, by a second signal converter of the temperature monitor, the digital voltage signal to a temperature signal corresponding to the temperature of the substrate.

14. The temperature monitoring method for the substrate heating furnace according to claim 12, wherein, after the step of monitoring, by the temperature monitor, the temperature of the substrate which has been heated by the substrate heating furnace and is located on the prong of the mechanical arm, the temperature monitoring method for the substrate heating furnace further comprises:

comparing, by a controller, the temperature of the substrate monitored by the temperature monitor with a preset temperature range;

displaying, by a display, the temperature of the substrate monitored by the temperature monitor; when the temperature of the substrate monitored by the temperature monitor falls into the preset temperature range, further displaying, by the display, information which represents that the temperature is normal; and when the temperature of the substrate monitored by the temperature monitor does not fall into the preset temperature range, further displaying, by the display, information which represents that the temperature is abnormal; and sending out, by an alarm, an alarm, when the temperature of the substrate monitored by the temperature monitor does not fall into the preset temperature range.

15. The temperature monitoring method for the substrate heating furnace according to claim 12, wherein, before the step of monitoring, by the temperature monitor, the temperature of the substrate which has been heated by the substrate heating furnace and is located on the prong of the mechanical arm, the temperature monitoring method for the substrate heating furnace further comprises:

sticking the prong into the substrate heating furnace, and lifting the substrate which has been heated by the substrate heating furnace in the substrate heating furnace through the prong;

sending, by a substrate detector on the mechanical arm, a signal representing that the substrate heated by the substrate heating furnace is lifted through the prong, to the controller; and controlling, by the controller, the temperature monitor to monitor the temperature of the substrate which has been heated by the substrate heating furnace and is located on the prong.

* * * * *